Jan. 14, 1969    R. L. KALISH ET AL    3,421,782
TUBE END FITTING
Filed Nov. 16, 1965

INVENTORS
Robert L. Kalish
Anthony J. Kanyok
Warren E. Hulick
Edward A.G. Hamer

BY *Eli Weiss*
ATTORNEY

United States Patent Office 3,421,782
Patented Jan. 14, 1969

3,421,782
TUBE END FITTING
Robert L. Kalish, Nixon, Anthony J. Kanyok, East Hanover, Warren E. Hulick, Somerville, and Edward A. G. Hamer, Metuchen, N.J., assignors to American Standard Inc., New York, N.Y., a corporation of Delaware
Filed Nov. 16, 1965, Ser. No. 508,054
U.S. Cl. 285—248         3 Claims
Int. Cl. F16l 33/00

ABSTRACT OF THE DISCLOSURE

An end fitting for a tube which comprises in combination an expandable member adapted to be inserted in the tube near an end thereof and expanded radially against the interior of the tube, thereby forming a seal, the seal being effective to prevent fluid transfer to the end of the tube from portions of the interior of the tube separated from the end by the seal, and tubular means communicating with the interior of the tube at a point therein separated from the end of the seal.

---

This invention relates to end fittings for tubes. In particular, this invention relates to end fittings suitable for application to porous tubes, enabling them to be coupled to conventional tubing or piping systems.

In a variety of applications, it is necessary to provide a liquid-containing tubing system, for example a pipe line or the like, with an in-line section of porous tubing for various purposes such as filtering out solid particles, separating water from hydrocarbon fuels, etc. In substantially all of such applications, it is important to prevent leakage of liquid from the feed side (usually the inside of such a porous tube) to the effluent or discharge side, in such a way that it bypasses the porous section instead of being filtered through it.

In a recent development of particular current interest, a porous tube is used as a means of desalinating sea water or brackish waters by reverse osmosis. Such a porous tube may comprise a tubular osmotic membrane, such as that described and claimed in copending application Ser. No. 508,052, filed November 16, 1965, which is surrounded and supported by a porous tubular support member, one type of which is disclosed and claimed in copending application Ser. No. 508,037, filed November 16, 1965. Both of said copending applications are assigned to the assignee hereof.

The reverse osmosis process is simple in principle, but has proven difficult in execution as applied to the desalination of water. The process is based on the fact that the normal flow of water through a semipermeable membrane, from the pure water side to the brine side, can be reversed by maintaining the brine side at a pressure higher than the osmotic pressure of the system. Thus, for sea water, which is approximately 3½% NaCl, the osmotic pressure is approximately 340 p.s.i., which represents the force tending to cause transport of water from the pure-water side of the membrane into the brine. If a pressure in excess of this figure is applied to the brine solution, the direction of flow is reversed, so that water migrates through the membrane to the pure water side, where it may be collected, leaving behind a more concentrated brine which may then be discarded.

Although, theoretically, any pressure on the brine side in excess of about 340 p.s.i. will cause reverse osmosis and hence produce purified water, it has been found in practice, that in order to obtain economically practicable rates of production, it is necessary to operate at much higher working pressures, and pressures of 1500 p.s.i. and higher are commonly recommended for desalination of sea water. Somewhat lower pressures are usable for desalting brackish waters, because of the lower salt content of the water to be purified, and the correspondingly smaller value of the osmotic pressure to be overcome. Even in the treatment of brackish waters, however, pressures as high as 600 p.s.i. and higher are customary.

In order to withstand these high working pressures, it has been proposed to use osmotic membranes which are supported on the low-pressure side (i.e. the pure water side) by porous supporting members. Typical systems heretofore proposed have been in a form similar to a plate-and-frame filter press, using flat membranes each being backed up by a porous support member in the form of a flat, porous plate, sometimes with radial channels drilled therein to accommodate flow of water through and out of the plate to a suitable receiver.

These conventional types of apparatus have suffered from a number of disadvantages, including the necessity of using massive, complicated construction elements to form each separation chamber, at least one wall of which consists of an osmotic membrane, backed up by its porous support.

These chambers also suffered from the disadvantage of requiring complicated sealing arrangements to prevent the pressurized brine from bypassing the membrane and contaminating the purified water. The tubular type of construction referred to above, comprising a pressure-containing vessel in the form of a hollow, porous support tube surrounding and supporting a tubular osmotic membrane, represented a largely successful attempt to overcome the difficulties encountered with the conventional construction employing flat membranes backed up by flat supporting members. Nevertheless, certain difficulties remained to be overcome. Thus, while the tubular construction simplified matters in that each tube serves as a pressure chamber, thus avoiding the necessity of constructing massive elements as in the plate-and-frame design, it was nevertheless necessary to seal the ends of each tubular chamber, so as to prevent pressurized brine from leaking at the ends of the tubular chamber, and thus making its way to the outside of the tube and contaminating the purified water. Conventional methods of sealing the ends of tubes, such as flared fittings, compression fittings and the like, proved to be unsatisfactory in this respect, because they allower access of pressurized brine to the exposed end of the porous support tube, or actually tore the membrane so that the brine could enter the ends of the walls of the support tube (bypassing the osmotic membrane liner), and diffuse longitudinally through the support tube outside the membrane, thus mixing with and contaminating the purified water passing radially through the liner and the support tube.

An object of this invention, therefore, is to provide improved end fittings for tubes.

Another object is to provide end fittings particularly suitable for coupling porous tube sections into conventional pipe lines, tubing lines, and the like.

Still another object is to provide end fittings for porous tube sections, which provide effective sealing against the possibility of liquids bypassing said porous tubes by leaking out adjacent the ends thereof.

Yet another object is to provide end fittings for porous tubes which prevent access of contained liquid to exposed edges at the ends of said tubes.

A feature of this invention is the use of an expandable sealing member adapted to be placed inside a porous tube having a liner film, and to be expanded against said liner film, thereby isolating the end of said tube from contained liquid.

Another feature is the use of a collar adapted to surround a portion of said porous tube near an end thereof and resist radial expansive force exerted by said sealing member.

Other objects, features and advantages will become apparent from the following more complete description and claims, and by reference to the accompanying drawings.

In a particularly desirable aspect, this invention contemplates an end fitting for a tube, comprising in combination an expandable member adapted to be inserted within said tube near an end thereof and expanded radially against the interior of said tube, thereby forming a seal, said seal being effective to prevent fluid transfer to the end of said tube from portions of the interior of said tube separated from said end by said seal, and tubular means communicating with the interior of said tube at a point therein separated from said end by said seal.

Referring now to the figures.

Figure 1:
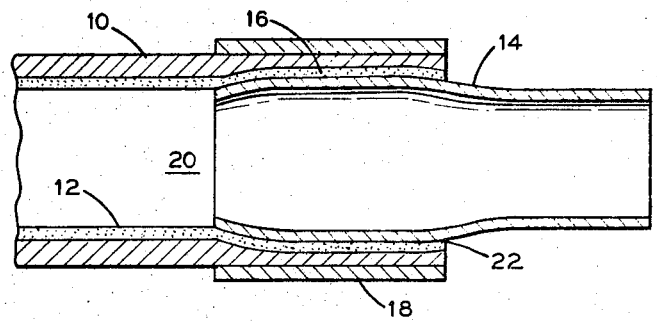
FIG. 1 is a longitudinal, medial cross section of an end portion of a tube provided with an end fitting according to one embodiment of the invention.

As shown in FIG. 1, for example, porous support tube 10, which is provided with an internal liner consisting of osmotic membrane 12, is further provided with a fitting in the form of metal tube 14. Tube 14, as originally inserted in the end of porous tube 10 (and internally of osmotic membrane liner 12) is a straight cylindrical tube, having an external diameter just small enough to be readily inserted into the end of osmotic membrane liner 12. After being inserted, tube 14 is expanded from within, using a conventional tube-expander or any other convenient means, so as to press against membrane 12 and support 10, forming a seal as indicated generally at 16. In most cases, it will be found preferable to provide a back-up member such as collar 18 to resist the outward radial force of the expanding tube, so as to ensure that porous support 10 and membrane 12 will be actually compressed, rather than being merely flared, thus providing a positive seal. The collar may be dispensed with in cases where the tube has sufficient tensile strength and rigidity to form a good seal without its assistance.

It will be evident from inspection of FIG. 1 that tube 14 communicates with the interior membrane 12, as indicated generally at 20, in a region which is isolated by seal 16 from the end of the membrane and support tube. This construction therefore prevents the contained liquid (brine, for example) from bypassing membrane 12 and leaking out at 22.

Figure 2:
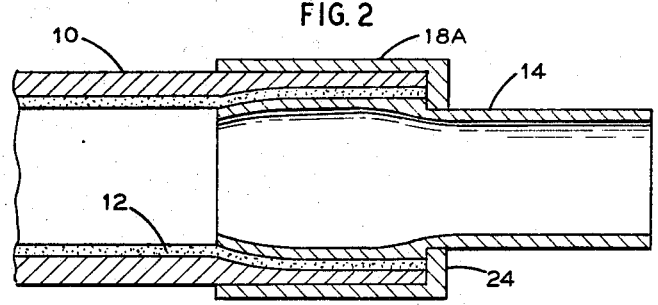
FIG. 2 is a cross section similar to FIG. 1, showing a modification of the embodiment shown in FIG. 1.

FIG. 2 shows a modification of the embodiment shown in FIG. 1, differing therefrom in that collar 18A projects inwardly as at 24 to cover the exposed edges at the end of the tube. This construction provides an additional restraint against tensile forces tending to separate the tube 14 from the support tube 10 and the osmotic membrane liner 12.

Figure 3:
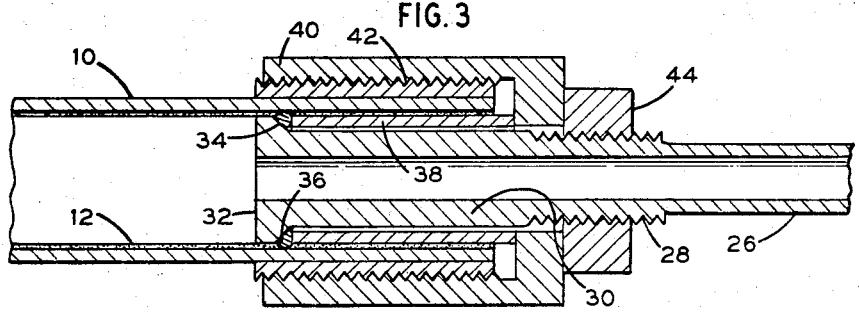
FIG. 3 is a longitudinal, medial cross section showing an end portion of a tube provided with an end fitting according to another embodiment of the invention.

The preferred embodiment shown in FIG. 3 comprises a connecting tube 26, an O-ring 36, a floating collar 38, a cap nut 40 which is preferably provided with suitable external flats to provide for wrenching and may be, for example a hexagonal cap nut, a threaded collar 42 and a standard nut, for example a hexagonal nut, 44. Connecting tube 26 is provided with a threaded portion 28, a cylindrical portion 30 and an enlarged shoulder 32 having a tapered face 34 on the side thereof facing the cylindrical and threaded portions.

The fitting of FIG. 3 is assembled in the following sequence: Threaded collar 42 is fastened to the outside of the porous tube 10 by means of a suitable adhesive such as an epoxy cement. The connecting tube 26 which bears shoulder 32 and has O-ring 36 and floating collar 38 positioned around it is then inserted into the end of conduit 10. The cap nut 40 is then turned down on collar 42. Finally, the sealing action is obtained by tightening nut 44 against cap nut 40 which compresses O-ring 36 between tapered face 34 and the end of floating collar 38, forcing O-ring 36 to expand radially and form a seal against the inner wall of membrane 12. A unique feature of this embodiment is that there is no rotation of any part within the tube if during the last step of the assembly, the exposed section of connecting tube 26 and support tube 10 are immobilized. This is highly desirable since any rotation of the membrane 12 will tend to wrinkle and tear it. Again, it will be noted that the seal thus formed isolates the ends of membrane 12 and support tube 10 from the liquid-containing interior of the conduit, with which connecting tube 26 communicates.

While this invention has been described in terms of certain preferred embodiments and illustrated by way of certain drawings, these are illustrative only, as many alternatives and equivalents will readily occur to those skilled in the art, without departing from the spirit or proper scope of the invention. The invention is therefore not to be construed as limited, except as set forth in the appended claims.

What is claimed is:

1. An end fitting for a tube, comprising in combination a connecting tube having a shoulder thereon, said connecting tube and said shoulder being adapted to be inserted within said first mentioned tube near an end thereof, an O-ring encircling said connecting tube adjacent said shoulder, a floating collar surrounding said connecting tube for compressing said O-ring against said shoulder, said O-ring being situated between said collar and said shoulder, thereby forcing said O-ring to expand radially forming a seal between said connecting tube and said first mentioned tube at a point spaced from said first mentioned tube, means for urging said floating collar and said shoulder together thereby compressing said O-ring between them comprising means associated with said connecting tube for exerting a force on said shoulder tending to withdraw said shoulder from said first mentioned tube, an internally threading external collar for exerting an opposing force on said floating collar tending to resist withdrawal of said shoulder from said first mentioned tube, said external collar surrounding said first mentioned tube and having an inwardly propecting flange, said floating collar bearing axially against said flange, and an end fitting further comprising and intermediate collar, said intermediate collar being cemented to said first mentioned tube and externally threaded to mate with the internal threads of said external collar.

2. An end fitting according to claim 1 wherein said means for exerting force on said connecting shoulder comprises in combination a threaded portion on said connecting tube and a mating nut thereon, said nut bearing against said flange.

3. An end fitting according to claim 1 wherein said shoulder is provided with a tapered face on the side thereof near said O-ring.

References Cited

UNITED STATES PATENTS

| 1,928,836 | 10/1933 | Loughead | 285—258 X |
| 2,398,043 | 4/1946 | Saiafin | 285—338 X |
| 2,691,536 | 10/1954 | Tamminga | 285—416 X |
| 3,211,476 | 10/1965 | Wagner | 285—258 |

FOREIGN PATENTS

| 589,587 | 6/1947 | Great Britain. |
| 1,008,020 | 2/1952 | France. |

THOMAS F. CALLAGHAN, *Primary Examiner.*

U.S. Cl. X.R.

210—315; 285—55, 258, 338, 423

UNITED STATES PATENT OFFICE
CERTIFICATE OF CORRECTION

Patent No. 3,421,782                                                          January 14, 1969

Robert L. Kalish et al.

It is certified that error appears in the above identified patent and that said Letters Patent are hereby corrected as shown below:

Column 4, line 35, after "said" insert -- end of said --.

Signed and sealed this 17th day of March 1970.

(SEAL)
Attest:

Edward M. Fletcher, Jr.                         WILLIAM E. SCHUYLER, JR.
Attesting Officer                                       Commissioner of Patents